United States Patent [19]

Sugiyama

[11] Patent Number: 5,068,722

[45] Date of Patent: Nov. 26, 1991

[54] MOTION VECTOR ESTIMATING APPARATUS

[75] Inventor: Kenji Sugiyama, Noda, Japan

[73] Assignee: Victor Company of Japan, Ltd., Yokohama, Japan

[21] Appl. No.: 614,478

[22] Filed: Nov. 16, 1990

[30] Foreign Application Priority Data

Jan. 23, 1990 [JP] Japan .................................... 2-13199

[51] Int. Cl.⁵ ........................ H04N 7/10; H04N 7/12; H04N 7/01
[52] U.S. Cl. .................................... 358/105; 358/136; 358/140
[58] Field of Search ................ 358/105, 135, 136, 140

[56] References Cited

U.S. PATENT DOCUMENTS

| | | | |
|---|---|---|---|
| 4,220,967 | 9/1980 | Ichida et al. | 358/105 |
| 4,543,607 | 9/1985 | Taylor et al. | 358/105 |
| 4,665,436 | 5/1987 | Osborne et al. | 358/136 |
| 4,777,530 | 10/1988 | Kondo | 358/105 |
| 4,862,259 | 8/1989 | Gillard et al. | 358/105 |
| 4,875,094 | 10/1989 | Haghiri et al. | 358/105 |
| 4,901,145 | 2/1990 | Harradine et al. | 358/105 |

Primary Examiner—John K. Peng
Attorney, Agent, or Firm—Lowe, Price, LeBlanc & Becker

[57] ABSTRACT

A motion vector estimating apparatus includes a plurality of block matching estimators generating block matching values from an input video signal respectively. The block matching values represent likelihoods of motion vectors with respect to an actual motion respectively. Each of the block matching values is periodically reset. A plurality of convolution adders receive the block matching values respectively. Each of the convolution adders provides predetermined weights to the block matching values and adds the weighted block matching values to obtain an output value. The smallest of the output values from the convolution adders is selected and a vector related to the smallest values is outputted as a final motion vector.

9 Claims, 2 Drawing Sheets

MOTION VECTOR ESTIMATING APPARATUS

BACKGROUND OF THE INVENTION

This invention relates to an apparatus for estimating a motion vector of a video signal.

A motion compensation technique is used in processing a video signal for data compression. In general, such a motion compensation technique requires an apparatus for estimating a motion vector of a video signal.

Some motion vector estimating apparatuses use a block matching method. In the block matching method, a frame of a video signal is divided into a plurality of blocks, and the blocks of a current frame and the blocks of a preceding frame are compared in pixel data values to estimate a motion vector.

In prior art motion vector estimating apparatuses of the block matching type, under conditions where parts of an image or a frame have different motions respectively, as the size of blocks is decreased, a resultant motion (a total motion) is estimated more accurately. On the other hand, as the size of blocks is decreased, the estimation of a motion is more easily affected by noises.

SUMMARY OF THE INVENTION

It is an object of this invention to provide an improved motion vector estimating apparatus.

According to a first aspect of this invention, a motion vector estimating apparatus comprising a plurality of block matching estimators generating block matching values from an input video signal respectively, wherein the block matching values represent likelihoods of motion vectors with respect to an actual motion respectively a plurality of convolution adders receiving the block matching values respectively, wherein each of the convolution adders provides predetermined weights to the block matching values and adds the weighted block matching values to obtain an output value; and means for selecting a smallest value of output values from the convolution adders, and outputting a vector related to the smallest value as a final motion vector.

According to a second aspect of this invention, a motion vector estimating apparatus comprising a plurality of block matching estimators generating block matching values from an input video signal respectively, wherein the block matching values represent likelihoods of motion vectors with respect to an actual motion respectively; a plurality of convolution adders receiving the block matching values respectively, wherein each of the convolution adders includes nonlinear converters, and the converters convert block matching values for blocks around an estimation-object block with a nonlinear conversion characteristic, and wherein each of the convolution adders provides predetermined weights to output values from the nonlinear converters and the block matching value for the estimation-object block and adds the weighted values to obtain an output value; and means for selecting a smallest value of output values from the convolution adders, and outputting a vector related to the smallest value as a final motion vector. Each of the block matching estimators may include apparatus for periodically resetting the block matching values.

DESCRIPTION OF THE PREFERRED EMBODIMENT

A motion vector estimating apparatus according to an embodiment of this invention uses a block matching method in which a frame of a video signal is divided into a set of blocks and the video signal is processed block by block. Each of the blocks has a predetermined number of pixels, for example, $8 \times 8$ or $16 \times 16$ pixels.

Figure 1:
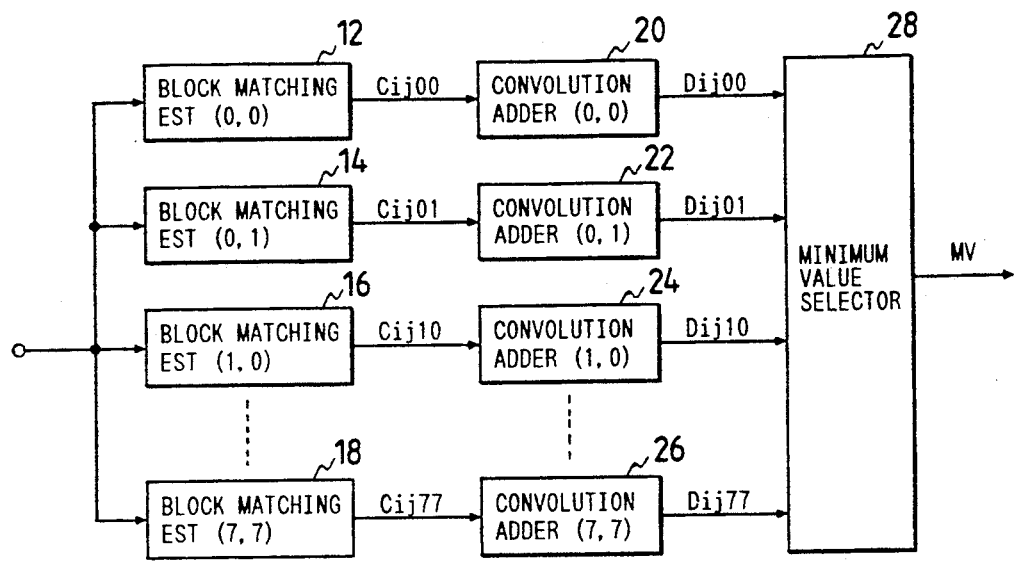
FIG. 1 is a block diagram of a motion vector estimating apparatus according to an embodiment of this invention.

With reference to FIG. 1, a digitized video signal is applied to a set of block matching estimators. Only four of the block matching estimators are shown as 12-18 while the total number of the block matching estimators is generally equal to a predetermined number greater than 4.

The block matching estimators 12-18 derive the squares of the differences in pixel data value between a current frame and an immediately preceding frame of the video signal. The squares calculated by the block matching estimators 12-18 are block matching values which represent the likelihoods of motion vectors with respect to an actual motion. In the case of blocks each having $8 \times 8$ pixels, the block matching estimators 12-18 calculate the block matching values Cijkl by referring to the following equation.

$$Cijkl = \sum_{n=1}^{8} \sum_{m=1}^{8} \{P(8i + n)(8j + m) - P'(8i + n - k)(8j + m - l)\}^2 \quad (1)$$

where P(x)(y) denotes the value of data on the pixel, whose order numbers are x-th in horizontal and y-th in vertical, of the current frame; P'(x)(y) denotes the value of data on the pixel, whose order numbers are x-th in horizontal and y-th in vertical, of the immediately preceding frame; "i" denotes the order number of the block in a horizontal direction; "j" denotes the order number of the block in a vertical direction; "n" denotes the order number of the pixel in the block in a horizontal direction; "m" denotes the order number of the pixel in the block in a vertical direction; "k" denotes a shift amount in a horizontal direction; and "l" denotes a shift amount in a vertical direction. The shift amounts "k" and "l", which are usually varied up to about $\pm 7 \sim \pm 15$ elements, define an estimation range. In addition, the shift amounts "k" and "l" compose a motion vector.

The block matching estimator 12 calculates the matching value Cij00 corresponding to the motion vector for $k=0$ and $l=0$. The block matching estimator 14 calculates the matching value Cij01 corresponding to the motion vector for $k=0$ and $l=1$. The block matching estimator 16 calculates the matching value Cij10 corresponding to the motion vector for $k=1$ and $l=0$.

The block matching estimator 18 calculates the matching value Cij77 corresponding to the motion vector for k=7 and l=7. The other block matching estimators calculate the remaining matching values Cijkl corresponding to the other motion vectors.

Figure 2:
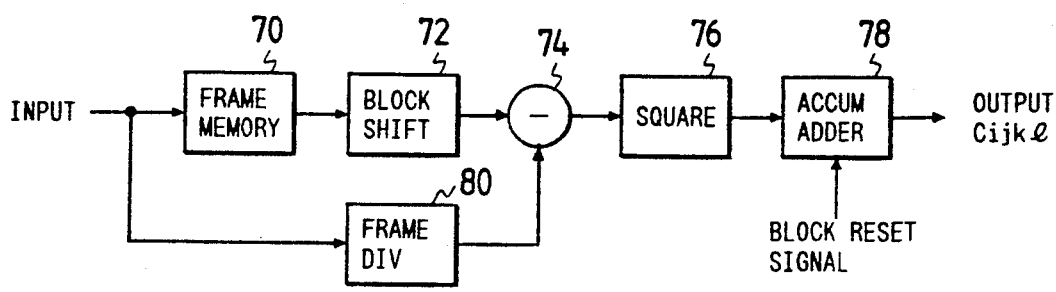
FIG. 2 is a block diagram of a block matching estimator of FIG. 1.

The block matching estimators 12-18 are similar to conventional ones. As shown in FIG. 2, each of the block matching estimators 12-18 includes a frame memory 70, a block shifter 72, a subtracter 74, a square device 76, an accumulative adder 78, and a frame divider 80. The pixel data represented by the digitized video signal are fed to the frame memory 70 and the frame divider 80 in a sequence determined by a line-by-line raster scanning format. Frames of the digitized video signal are sequentially stored into the frame memory 70. The video signal is read out from the frame memory 70 in a block-by-block manner. The frame memory 70 functions to delay the video signal to derive a preceding frame of the video signal. The video signal read out from the frame memory 70 is transmitted to the subtracter 74 via the block shifter 72. The block shifter 72 functions to shift the block by a two-dimensional amount which is determined by the shift amounts "k" and "l". The block shifter 72 applies the preceding frame of the video signal to the subtracter 74.

The frame divider 80 divides a current frame of the video signal into blocks each having 8×8 pixels. The frame divider 80 applies the current frame of the video signal to the subtracter 74. The subtracter 74 successively derives the differences in data value between the pixels of the preceding frame and the pixels of the current frame. The pixel data differences derived by the subtracter 74 are sequentially squared by the square device 76. The squares of the differences which are obtained by the square device 76 are added by the accumulative adder 78 so that the matching value Cijkl is calculated. The accumulative adder 78 is periodically reset by a block reset signal for each of the blocks. The frame memory 70 can be shared with all the block matching estimators.

Returning to FIG. 1, the matching values Cijkl are fed from the block matching estimators to convolution adders respectively. Only four of the convolution adders are shown as 20-26 while the total number of the convolution adders is generally equal to a predetermined number greater than 4. In case the shift amounts k and l are respectively varied up to ±7 elements, the total number of the convolution adders is 225.

Figure 3:
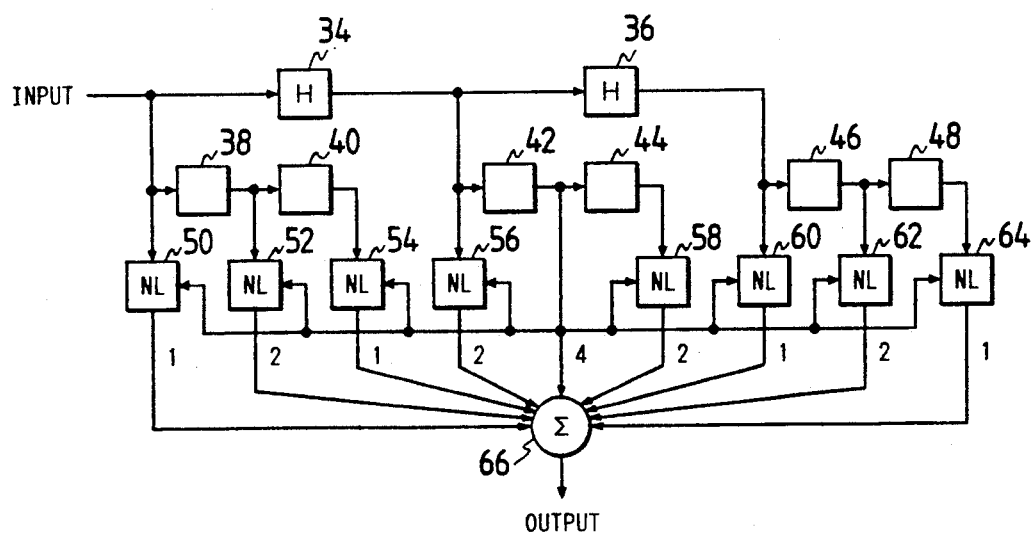
FIG. 3 is a block diagram of a convolution adder of FIG. 1.

The convolution adders 20-26 are similar in internal design. As shown in FIG. 3, each of the convolution adders 20-26 includes line block delay devices 34 and 36, block delay devices 38-48, nonlinear converters 50-64, and a weighting adder 66. The line block delay devices 34 and 36 function to store the matching values for the number of blocks in a horizontal direction in order to provide a 1-line delay. In the case where a horizontal line has 360 pixels, the line block delay devices 34 and 36 are each composed of a memory having a capacity corresponding to 45 blocks. The block delay devices 38-48 function to delay the matching values corresponding to one block.

The convolution adding process executed by the convolution adder is similar to a general low-pass filtering (LPF) process for pixel values, but the convolution adding process is made on the matching values for the respective blocks in place of the pixel values. The delay by the line block delay devices 34 and 36 corresponds to a 1-line delay in the LPF process, while the delay by the block delay devices 38-48 corresponds to a 1-pixel delay in the LPF process.

For the blocks other than the central block, the advanced matching values and the delayed matching values ("advanced" and "delayed" are referred with respect to the central block) outputted from the delay devices 34-40 and 44-48 are subjected to nonlinear conversion by the nonlinear converters 50-64. The nonlinear converters 50-64 are similar in design.

Figure 4:
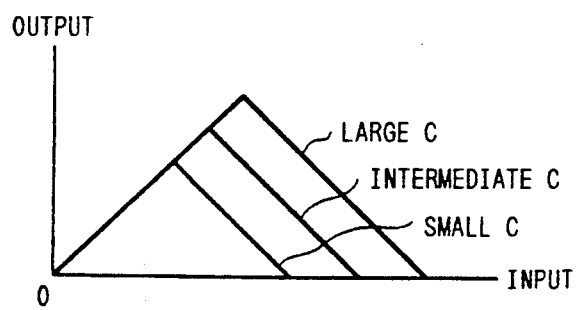
FIG. 4 is a diagram showing the input-output characteristic of a nonlinear converter of FIG. 3.

As shown in FIG. 4, in the case where an input value into the nonlinear converter is below a reference level, an output value from the nonlinear converter is proportional to the input value. In the case where the input value exceeds the reference level, the output value decreases gradually down to zero as the input value increases from the reference level. The reference level is changed among three different levels which determine three different types of the input-output characteristic of the nonlinear converter. The input-output characteristic of the nonlinear converter is selected from one of the three types in response to the degree of the matching of the object block. Specifically, the reference level is decreased as the matching is better.

The output matching value from the block delay device 42 which corresponds to the central block is fed to control terminals of the nonlinear converters 50-64. The input-output characteristic of the nonlinear converters 50-64 is changed among the previously-mentioned three types in response to the fed matching value. The nonlinear converters 50-64 includes sections which enable the input-output characteristic to be changed in response to the matching value fed to their control terminals.

It should be noted that the number of the different input-output characteristics of the nonlinear converter may be different from three. The input-output characteristic of the nonlinear converter may also be varied continuously.

Figure 5:
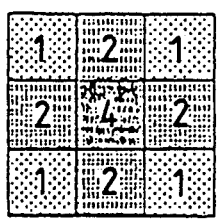
FIG. 5 is a diagram showing the characteristic of the weighted addition executed by the weighting adder of FIG. 3.

The weighting adder 66 gives predetermined weights to the output values from the nonlinear converters 50-64 and the output value from the block delay device 42 and adds the resultant weighted values, thereby deriving a convolution weighted addition result Dijkl, which is expressed by the following equation.

$$\begin{aligned}D_{ijkl} = \ &C'(i-1)(j-1)kl + \\ &2C'i(j-1)kl + C'(i+1)(j-1)kl + \\ &2C'(i-1)jkl + 4C'jkl + \\ &2C'(i+1)jkl + C'(i-1)(j+1)kl + \\ &2C'i(j+1)kl + C'(i+1)(j+1)kl\end{aligned} \quad (2)$$

where the characters C' denote the output values from the nonlinear converters 50-64 and the output value from the block delay device 42. FIG. 5 shows the characteristic of the convolution weighted addition which is illustrated from a spatial viewpoint. In FIG. 5, square segments correspond to blocks respectively and the central square segment corresponds to the estimation-object block, and the numerals and the densities of the screen dots represent the degrees of weighting.

The addition results Dijkl are fed from the convolution adders to a minimum value selector 28. The smallest of the addition results Dijkl is selected by the minimum value selector 28, and the vector (k, l) related to the smallest one is outputted from the device 28 as a final motion vector MV.

As described previously, the degrees of matching for the blocks around the object block are subjected to the nonlinear conversion and are then added to the degree of matching for the object block in the weighted addition process. Therefore, in the case where the block size is small, the estimation of a motion is scarcely affected by noises in the video signal so that a good reliability of the motion estimation is maintained. Furthermore, in motion-compensated inter-frame encoding, the efficiency of prediction is improved so that an output data amount can be small. In addition, in frame number conversion, a block distortion is inconspicuous.

What is claimed is:

1. A motion vector estimating apparatus comprising:
   a plurality of block matching estimators generating block matching values from an input video signal respectively, wherein the block matching values represent likelihoods of motion vectors with respect to an actual motion respectively;
   a plurality of convolution adders receiving the block matching values respectively, wherein each of the convolution adders provides predetermined weights to the block matching values and adds the weighted block matching values to obtain an output value; and
   means for selecting a smallest value of output values from the convolution adders, and outputting a vector related to the smallest value as a final motion vector.

2. A motion vector estimating apparatus as recited in claim 1 wherein each of said block matching estimators includes means for periodically resetting the block matching values.

3. A motion vector estimating apparatus as recited in claim 2 wherein said means for periodically resetting the block matching values comprises an adder and a block reset signal applied thereto.

4. A motion vector estimating apparatus comprising:
   a plurality of block matching estimators generating block matching values from an input video signal respectively, wherein the block matching values represent likelihoods of motion vectors with respect to an actual motion respectively;
   a plurality of convolution adders receiving the block matching values respectively, wherein each of the convolution adders includes nonlinear converters, and the converters convert block matching values for blocks around an estimation-object block with a nonlinear conversion characteristic, and wherein each of the convolution adders provides predetermined weights to output values from the nonlinear converters and the block matching value for the estimation-object block and adds the weighted values to obtain an output value; and
   means for selecting a smallest value of output values from the convolution adders, and outputting a vector related to the smallest as a final motion vector.

5. The motion vector estimating apparatus of claim 4 wherein each of the convolution adders comprises means for changing the nonlinear conversion characteristic in response to the block matching value for the estimation-object block.

6. A motion vector estimating apparatus as recited in claim 4 wherein each of said block matching estimators includes means for periodically resetting the block matching values.

7. A motion vector estimating apparatus as recited in claim 6 wherein said means for periodically resetting the block matching values comprises an adder and a block reset signal applied thereto.

8. An apparatus for processing a video signal in which a frame of the video signal is divided into a predetermined number N1 of blocks, and the video signal is processed sequentially block by block, the apparatus comprising:
   a predetermined number N2 of block matching estimators generating respective block matching values for a block as functions of an input video signal, wherein the block matching values represent likelihoods of motion vectors with respect to an actual motion respectively;
   N2 convolution adders respectively receiving the block matching values from the block matching estimators, wherein each of the convolution adders provides a predetermined number N3 of predetermined weights to respective block matching values which are sequentially outputted from the respective block matching estimator and which correspond to adjacent blocks, and adds the weighted block matching values to obtain an output value for a current object block; and
   means for selecting a smallest value of output values from the convolution adders, and outputting a vector related to the smallest value as a final motion vector for the current object block.

9. An apparatus for processing a video signal in which a frame of the video signal is divided into a predetermined number N1 of blocks, and the video signal is processed sequentially block by block, the apparatus comprising:
   a predetermined number N2 of block matching estimators generating respective block matching values for a block as functions of an input video signal, wherein the block matching values represent likelihoods of motion vectors with respect to an actual motion respectively;
   N2 convolution adders respectively receiving the block matching values from the block matching estimators, wherein each of the convolution adders includes nonlinear converters, and the converters convert block matching values, which are sequentially outputted from the respective block matching estimator and which correspond to blocks around a current object block, with a nonlinear conversion characteristic, and wherein each of the convolution adders provides predetermined weights to output values from the nonlinear converters and the block matching value for the current object block and adds the weighted values to obtain an output value for a current object block; and
   means for selecting a smallest value of output values from the convolution adders, and outputting a vector related to the smallest value as a final motion vector for the current object block.

* * * * *